(12) United States Patent
Muller et al.

(10) Patent No.: US 9,193,441 B2
(45) Date of Patent: Nov. 24, 2015

(54) METHOD AND DEVICE FOR DISPLAYING SPEED INFORMATION ON AN AIRCRAFT

(71) Applicant: AIRBUS OPERATIONS (SAS), Toulouse (FR)

(72) Inventors: Jean Muller, Tournefeuille (FR); Christophe Poujol, Saint-Jory (FR)

(73) Assignee: Airbus Operations (SAS), Toulouse (FR)

( * ) Notice: Subject to any disclaimer, the term of this patent is extended or adjusted under 35 U.S.C. 154(b) by 109 days.

(21) Appl. No.: 13/765,010

(22) Filed: Feb. 12, 2013

(65) Prior Publication Data
US 2013/0238171 A1 Sep. 12, 2013

(30) Foreign Application Priority Data
Feb. 13, 2012 (FR) ..................... 12 51322

(51) Int. Cl.
| G06F 7/70 | (2006.01) |
|---|---|
| B64C 19/00 | (2006.01) |
| B64D 31/02 | (2006.01) |
| B64D 31/04 | (2006.01) |
| B64D 43/02 | (2006.01) |

(52) U.S. Cl.
CPC ............... *B64C 19/00* (2013.01); *B64D 31/02* (2013.01); *B64D 31/04* (2013.01); *B64D 43/02* (2013.01)

(58) Field of Classification Search
CPC ........ B64C 19/00; B64D 43/02; G01C 23/00; G08G 5/0021
USPC .......................... 701/3, 14; 340/971–975, 967
See application file for complete search history.

(56) References Cited

U.S. PATENT DOCUMENTS

| 3,789,661 | A * | 2/1974 | Melsheimer ................. 73/178 T |
|---|---|---|---|
| 4,312,041 | A * | 1/1982 | DeJonge ....................... 701/123 |
| 4,419,079 | A * | 12/1983 | Georges et al. ................. 434/43 |
| 5,277,024 | A * | 1/1994 | Bissey et al. .............. 60/39.281 |
| 5,289,185 | A * | 2/1994 | Ramier et al. ................. 340/971 |
| 6,961,643 | B1 * | 11/2005 | Younkin et al. .................... 701/7 |
| 2002/0099478 | A1 * | 7/2002 | Ishihara et al. .................... 701/9 |
| 2003/0193410 | A1 * | 10/2003 | Chen et al. ..................... 340/971 |
| 2005/0098681 | A1 * | 5/2005 | Berson et al. ................. 244/1 N |
| 2005/0119802 | A1 * | 6/2005 | Kane ................................. 701/9 |
| 2005/0187677 | A1 * | 8/2005 | Walker ............................ 701/16 |
| 2005/0200502 | A1 * | 9/2005 | Reusser et al. ................ 340/973 |
| 2006/0290532 | A1 * | 12/2006 | Persson et al. ................ 340/975 |
| 2007/0005198 | A1 * | 1/2007 | Maris ............................. 701/14 |
| 2010/0033350 | A1 * | 2/2010 | Papineau et al. ............. 340/967 |
| 2011/0238277 | A1 * | 9/2011 | Lacoste et al. ................. 701/70 |
| 2012/0158220 | A1 * | 6/2012 | Accardo et al. ................ 701/15 |

FOREIGN PATENT DOCUMENTS

WO WO 2009/053964 4/2009

OTHER PUBLICATIONS

French Search Report for FR Application 1251322, (Oct. 24, 2012), Yosri, Samir, 1 page.

* cited by examiner

*Primary Examiner* — Tuan C. To
*Assistant Examiner* — Shardul Patel
(74) *Attorney, Agent, or Firm* — Nixon & Vanderhye P.C.

(57) ABSTRACT

The display device (1) comprises means (3) for correcting an acceleration value used for displaying on a screen (7) a speed trend of the airplane, making it possible to zero a speed trend symbol (11) when the Mach number of the airplane does not vary.

15 Claims, 1 Drawing Sheet

METHOD AND DEVICE FOR DISPLAYING SPEED INFORMATION ON AN AIRCRAFT

CROSS REFERENCE TO RELATED APPLICATIONS

This application is based on and claims priority from France Application No. 12 51322, filed on Feb. 13, 2012, the entire contents of which is incorporation herein by reference.

BACKGROUND OF THE INVENTION

The present invention relates to a method and a device for displaying speed information on an airplane, in particular a transport airplane.

DESCRIPTION OF THE PRIOR ART

It is known that, on new-generation airplanes, the air speed of the airplane is presented to the pilot on a piloting screen, of PFD ("Primary Flight Display") type, which is installed on the instrument panel of the flight deck.

The air speed displayed is an air speed of CAS (for "Calibrated Airspeed", namely a corrected speed) type, that is to say an equivalent of airplane dynamic pressure, and not simply the relative speed of the airplane with respect to the air molecules.

In order to enhance the speed indication, the speed information display devices of modern airplanes carry out, in general, in addition a display of a speed trend, in the form of a trend arrow, which indicates the speed that the airplane will have in a predetermined duration, for example in ten seconds, if it retains a constant air acceleration. The size of this trend arrow is therefore proportional to the variation in the speed.

Most of the time, during a descent, the airplane flies firstly at constant Mach (either the optimal Mach number for a nominal descent, or the maximum operational Mach number for an emergency descent), and then it flies at constant CAS speed (either the optimal speed for a nominal descent, or the maximum operational speed for an emergency descent).

A drawback of the display in terms of speed (CAS) and speed derivative (speed trend arrow) is that, when the airplane descends on an iso-Mach, that is to say with a constant Mach number, the speed varies continually and the derivative of this speed is nonzero.

It is then difficult for the pilot to maintain a constant Mach number by manual piloting. This is particularly true in an emergency descent where the descent rate is very significant, thereby giving rise to a trend arrow of significant size.

This standard display solution therefore affords an impediment to the pilot, notably during an iso-Mach descent.

SUMMARY OF THE INVENTION

The present invention relates to a method of displaying speed information on an airplane, which makes it possible to remedy the aforementioned drawbacks.

For this purpose, according to the invention, said method according to which, in an automatic manner, in real time:
a current air speed (CAS) of the airplane is received;
a current acceleration value is calculated with the aid of said current air speed; and
at least one speed trend symbol (notably an arrow) which is representative of an acceleration value received and which indicates the speed of the airplane at the end of a predetermined duration, is displayed on a speed scale represented on a viewing screen,
is noteworthy in that, moreover, in an automatic manner and in real time:
a monitoring is carried out so as to be able to identify each of the following two situations: the airplane is controlled so as to fly according to a constant speed and the airplane is controlled so as to fly according to a constant Mach number;
a corrected value of the acceleration value is calculated, which is such that the corresponding speed trend symbol becomes zero when the Mach number of the airplane does not vary; and
the following are transmitted to said viewing screen for display thereof in the form of a speed trend symbol:
said current acceleration value, when the airplane is controlled so as to fly according to a constant speed; and
said corrected value, when the airplane is controlled so as to fly according to a constant Mach number.

Thus, by virtue of the invention, when the airplane is flying at iso-Mach, the acceleration value used for the display is corrected, doing so for the difference in slope of the iso-Machs with respect to the iso-speeds (in terms of CAS), as is specified hereinbelow, so as to zero the speed trend symbol when the Mach number of the airplane does not vary.

This solution thus allows the pilot, by zeroing the speed trend symbol in this situation, to readily maintain a constant Mach number by manual piloting, and to do so without modification of the graphical representation of the speed scale to which he is accustomed. The present invention makes it possible consequently to remove the aforementioned impediment and to remedy the drawbacks of a standard speed trend display.

Moreover, in an advantageous manner, to calculate said corrected value:
a corrective value which is proportional to the vertical speed of the airplane and which is dependent on the altitude and on the Mach number of the airplane is calculated; and
this corrective value is added to said current acceleration value to obtain said corrected value.

Furthermore, advantageously, to implement said monitoring, the following are monitored:
the selection which is carried out by a pilot on a control panel of FCU ("Flight Control Unit") type relating to an automatic piloting system, between a control for a flight according to a constant speed and a control for a flight according to a constant Mach number; and/or
an information item which is transmitted automatically by a flight management system of FMS ("Flight Management System") type, so as to control a flight according to a constant speed or a flight according to a constant Mach number.

The present invention also relates to a device for aiding the piloting of an airplane, carrying out a display of speed information.

According to the invention, said device of the type comprising:
means for receiving a current air speed;
means for calculating a current acceleration value with the aid of said current air speed; and
a viewing screen which displays, in real time, on a speed scale, at least one speed trend symbol which is representative of an acceleration value received and which indicates the speed of the airplane at the end of a predetermined duration,
is noteworthy in that it comprises, moreover:
monitoring means making it possible to identify each of the following situations: the airplane is controlled so as to fly according to a constant speed and the airplane is controlled so as to fly according to a constant Mach number;

calculation means for calculating a corrected value of the acceleration value, which is such that the corresponding speed trend symbol becomes zero when the Mach number of the airplane does not vary; and means for transmitting to said viewing screen for display thereof in the form of a speed trend symbol:

said current acceleration value when the airplane is controlled so as to fly according to a constant speed; and said corrected value when the airplane is controlled so as to fly according to a constant Mach number.

Furthermore, in a preferred embodiment, said calculation means comprise:

means for calculating a corrective value which is proportional to the vertical speed of the airplane and which is dependent on the altitude and on the Mach number of the airplane; and means for adding this corrective value to said current acceleration value to obtain said corrected value.

Moreover, advantageously, said monitoring means comprise:

means for monitoring at least the selection which is carried out by a pilot on a control panel relating to an automatic piloting system, between a control for a flight according to a constant speed and a control for a flight according to a constant Mach number; and/or means for monitoring at least one information item, which is transmitted automatically by a flight management system, so as to control a flight according to a constant speed or a flight according to a constant Mach number.

Moreover, the present invention also relates to an airplane, in particular a civil transport airplane, which comprises a device for aiding piloting such as that aforementioned.

BRIEF DESCRIPTION OF THE DRAWING

The figures of the appended drawing will elucidate the manner in which the invention may be embodied. In these figures, identical references designate similar elements.

DESCRIPTION OF THE PREFERRED EMBODIMENTS

Figure 1:
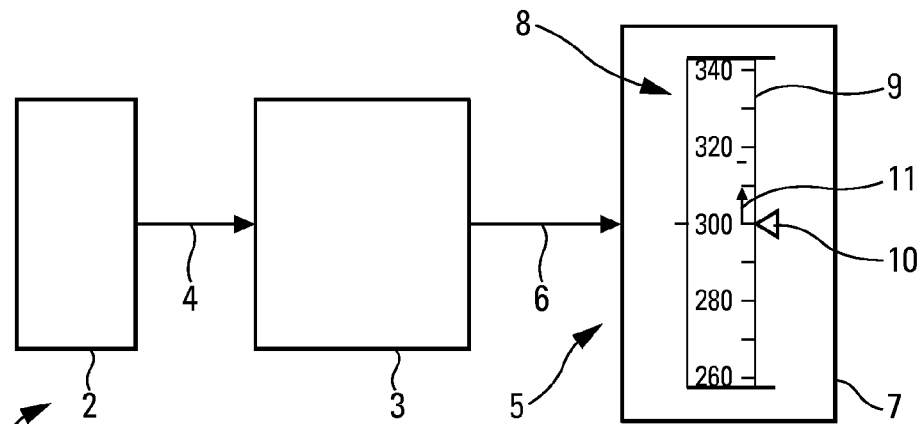
FIG. 1 is the schematic diagram of a display device in accordance with the invention.

The device 1 in accordance with the invention and represented schematically in FIG. 1 is intended to display speed information in the flight deck of an airplane (not represented), in particular of a transport airplane, to aid a pilot of the airplane to pilot said airplane manually, notably during a descent.

Accordingly, said device 1 is of the type comprising:

a set 2 of information sources, which comprises means for determining the effective values of parameters of the airplane, notably speeds;

a calculation unit 3 which is connected by way of a link 4 to said set 2 of information sources; and a viewing unit 5 which is connected to said calculation unit 3 by way of a link 6 and which is able to present, on a viewing screen 7, notably speed information.

Represented in FIG. 1 is solely a speed display window 8 of said viewing screen 7. This speed display window 8 comprises a speed scale 9 (preferably graduated in knots), on which is displayed, in real time:

symbol 10, for example of triangular shape, which indicates the current value of the air speed, of CAS (for "Calibrated Airspeed", namely a corrected speed) type, which is determined in a standard manner by means forming part of the set 2 and which is transmitted to said unit 5; and a speed trend symbol 11, preferably a trend arrow, which is representative of an acceleration value received and which indicates the speed that the airplane will have in a predetermined duration from the current instant, for example in ten seconds, if it retains a constant air acceleration. The size of this trend arrow 11 is therefore proportional to the variation of the speed. This standard display makes it possible notably to guide the pilot during manual piloting.

The calculation unit 3 comprises means 13 for calculating, in a standard manner, a current acceleration value, with the aid of said current air speed of CAS type, which is received from standard means of the unit 2 by way of a link 12. Accordingly, these means 13 comprise, in a standard manner, elements for carrying out firstly a derivation of the current air speed received, and elements for carrying out a filtering thereafter, notably with the aim of removing the noise due to turbulence.

Preferably, said viewing screen 7 is a piloting screen, of PFD ("Primary Flight Display") type, which in general comprises, moreover, a plurality of standard display windows (not represented) intended to display respectively trim, altitude and heading information.

A consequence of the display in terms of speed (symbol 10) and speed derivative (speed trend arrow 11), such as is described hereinabove, is that, when the airplane descends on an iso-Mach, that is to say with a constant Mach number, the air speed varies continually, as may be seen in FIG. 2, and the derivative of this speed is then nonzero.

Figure 2:
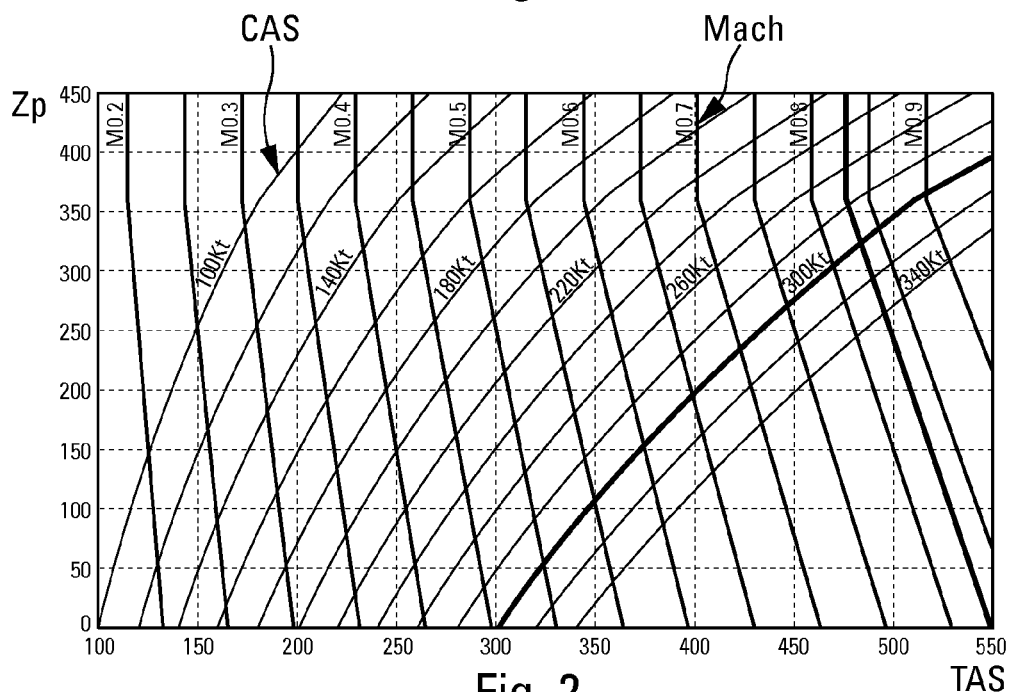
FIG. 2 is a chart which illustrates the respective variations of the iso-speeds and of the iso-Machs as a function of the true speed and of the altitude.

FIG. 2 is a chart which illustrates:

iso-speeds (CAS), that is to say curves of constant speed, for some of which has been indicated the corresponding speed expressed in knots (Kt): 100Kt, 140Kt, . . . ; and iso-Machs, that is to say curves of constant Mach number, for some of which has been indicated the corresponding Mach number (M): M0.2, M0.3, . . . .

These curves are represented on a chart, whose abscissa axis represents the true speed, of TAS ("True Airspeed") type, which is expressed in knots, and whose ordinate axis represents the altitude (Zp) which is expressed in terms of flight level, of FL ("Flight Level") type.

Generally, during a descent, an airplane flies firstly at constant Mach (either the optimal Mach number for a nominal descent, or the maximum operational Mach number for an emergency descent), and then it flies at constant CAS speed (either the optimal speed for a nominal descent, or the maximum operational speed for an emergency descent).

Figure 3:
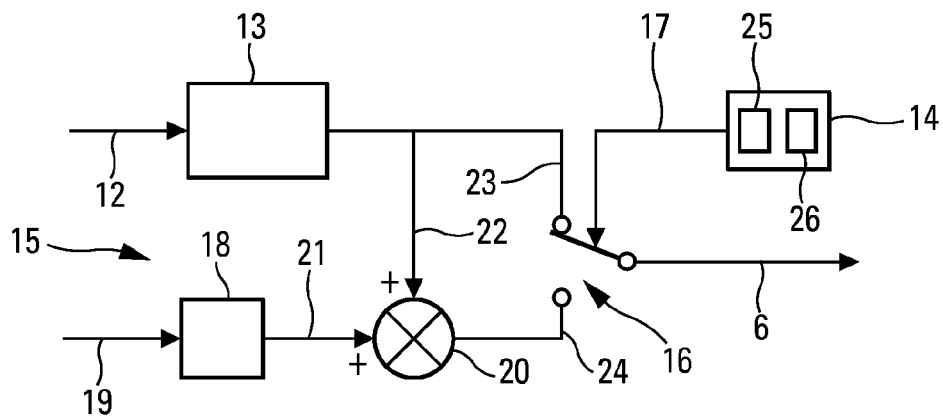
FIG. 3 is the schematic diagram of means of calculation of a display device in accordance with the invention.

In order to obtain a display that can be easily used by the pilot, notably during a descent, said device 1 comprises, moreover, as represented in FIG. 3:

monitoring means 14, specified hereinbelow, which form for example part of the set 2 and which make it possible to identify each of the following two different situations:

the airplane is controlled so as to fly according to a constant speed; and the airplane is controlled so as to fly according to a constant Mach number;

calculation means 15 for calculating a corrected value of the acceleration value, as specified hereinbelow, which is such that the corresponding speed trend symbol becomes zero when the Mach number of the airplane does not vary; and means 16 which take into account the result (received by a link 17) of the monitoring implemented by said monitoring means 14 and which are formed so as to transmit to said viewing screen 7 (via the link 6) for display thereof in the form of a speed trend arrow:

in a standard manner said current acceleration value, when the monitoring means 14 indicate that the airplane is controlled so as to fly according to a constant speed; and said corrected value, when the monitoring means 14 indicate that the airplane is controlled so as to fly according to a constant Mach number.

Thus, when the airplane is flying at iso-Mach, the device 1 in accordance with the invention corrects the acceleration value used for the display, doing so for the difference in slope of the iso-Machs with respect to the iso-speeds (in terms of CAS) as specified hereinbelow, so as to zero the speed trend arrow 11 when the Mach number of the airplane does not vary.

This solution thus allows the pilot, by zeroing the speed trend arrow 11 in this situation, to readily maintain a constant Mach number by manual piloting, and to do so without modification of the graphical representation of the speed display to which he is accustomed, since the same display is retained (with the scale 9, the speed symbol 10 and above all the speed trend symbol 11).

In a preferred embodiment, said calculation means 15 comprise:

means 18 for calculating a corrective value which is proportional to the vertical speed of the airplane and which is dependent on the altitude and on the Mach number of the airplane. Accordingly, said means 18 multiply a current value of the vertical speed of the airplane, which is received (via a link 19) from standard means forming for example part of the set 2, by a coefficient which depends on the altitude and on the Mach number, so as to obtain said corrective value; and means 20 for adding this corrective value (received by way of a link 21 from said means 18) to said current acceleration value (received by way of a link 22 from said means 13) so as ultimately to obtain said corrected value.

Said coefficient (used by the means 18) is determined, in a standard manner, on the basis notably of the information presented in FIG. 2 in such a way as to correct the acceleration value used for the display, for the difference in slope of the iso-Machs with respect to the iso-speeds, so as to obtain a zero value when the Mach number of the airplane does not vary.

The definition of this coefficient is based on the following formula for the corrective value:

$$\text{Value\_corrective} = \frac{dCAS}{dt_{at\_mach\_constant}}$$
$$= \frac{dCAS}{dZp} \times \frac{dZp}{dt_{at\_mach\_constant}}$$

in which:

$$\frac{dZp}{dt}$$

is the vertical speed; and $$\frac{dCAS}{dZp}$$

is the coefficient tabulated as a function of the altitude and of the Mach number, the values of the table being based (in a standard manner) on the atmospheric charts (as represented in FIG. 2).

Said means 16 are switching means which make it possible to transmit to said viewing screen 7 (via the link 6) for display thereof in the form of a speed trend symbol 11:

said current acceleration value, when the monitoring means 14 indicate that the airplane is controlled so as to fly according to a constant speed, by connecting the link 6 (via a link 23) to the output of the means 13; and said corrected value, when the monitoring means 14 indicate that the airplane is controlled so as to fly according to a constant Mach number, by connecting the link 6 (via a link 24) to the output of the means 20.

Said links 12 and 19 of FIG. 3 can form part of the link 4 of FIG. 1.

Moreover, in a particular embodiment, said monitoring means 14 comprise means 25 for monitoring the selection which is carried out by a pilot on a control panel, notably of FCU ("Flight Control Unit") type, relating to an automatic piloting system, namely the selection between a control for a flight according to a constant speed (SPD) and a control for a flight according to a constant Mach number (MACH). Accordingly, a control panel of FCU type comprises a MACH/SPD button allowing the pilot to select one or the other mode. This panel also allows the pilot to enter guidance setpoints into the system. Thus, by way of illustration, the detection of a flight at iso-Mach is carried out upon the toggling of the FCU panel to Mach mode following an intentional action of the pilot by pressing said MACH/SPD button.

Moreover, in a particular embodiment, said monitoring means 14 also comprise means 26 for monitoring an information item, which is transmitted automatically by a flight management system, of FMS ("Flight Management System") type, so as to control a flight according to a constant speed or a flight according to a constant Mach number.

The invention claimed is:

1. A method of displaying speed information on an airplane comprising the following steps performed automatically and in real time:

receiving a current air speed of the airplane;

calculating a current acceleration value using said current air speed; and displaying on a viewing screen at least one speed trend symbol which is representative of an acceleration value received and which indicates a speed of the airplane at the end of a predetermined duration, wherein the speed trend symbol is displayed on a speed scale represented on the viewing screen;

monitoring the aircraft and, based on the monitoring, identifying each of: the airplane being controlled to fly at a constant speed and the airplane being controlled to fly at a constant Mach number;

calculating a corrected value of the current acceleration value by:

determining a current vertical speed of the airplane and a coefficient value based on a current altitude and Mach number of the airplane;

calculating a corrective value based on a product of the current vertical speed and the coefficient value; and summing the corrective value and the current acceleration value to obtain the corrected value of the current-acceleration;

displaying on the viewing screen a speed trend symbol symbolizing:
the current acceleration value, while the airplane is controlled to fly at the constant speed; and
the corrected value while the airplane is controlled to fly at the constant Mach number.

2. The method as in claim 1, wherein the monitoring includes a selection by a pilot interacting with a control panel for an automatic piloting system in the airplane, and the selection is one of control for a flight according to a constant speed and a control for a flight according to a constant Mach number.

3. The method as in claim 1, wherein the monitoring includes at least one of: transmitting information by a flight management system indicating whether the airplane is being controlled to fly at a constant speed or a flight according to a constant Mach number.

4. A device for displaying attitude information on an airplane, said device comprising:
a primary flight display (PFD) including a viewing screen and a computer, wherein the PFD is configured to;
receive a current air speed of the airplane;
calculate a current acceleration value of the airplane using the current air speed;
generate a speed trend symbol for display on the viewing screen and proximate to a speed scale, wherein the speed trend symbol is representative of an acceleration value for the airplane and indicates a speed of the airplane at the end of a predetermined duration:
monitor the airplane to identify a condition during which the airplane is controlled to fly according to a constant speed and a condition during which the airplane is controlled to fly according to a constant Mach number;
calculate a corrected value of the acceleration value, wherein the calculation includes:
determining a current vertical speed of the airplane and a coefficient value dependent on a current altitude and Mach number of the airplane;
calculating a corrective value based on a product of the current vertical speed and the coefficient value, and
adding the corrective value to the current acceleration value to obtain the corrected value,
display on the viewing screen the form of the speed trend symbol, the current acceleration value while the airplane is controlled to fly according to a constant speed; and
display the corrected value of the acceleration value while the airplane is controlled to fly at the constant Mach number.

5. The device as in claim 4, wherein the monitoring includes a selection by a pilot interacting with a control panel of an automatic piloting system, wherein the selection is one of a control for a flight according to a constant speed and a control for a flight according to a constant Mach number.

6. The device as in claim 4, wherein the monitoring includes automatic transmission of information by a flight management system, wherein the information indicates whether the airplane is being controlled to fly at a constant speed or at a constant Mach number.

7. The device as in claim 4, wherein the view screen shows include which comprises, moreover, means for providing the data used in the calculations implemented by said device.

8. A method of displaying speed information on an airplane comprising:
measuring air speed of the airplane over a period of time;
calculating, responsive to said measured air speed, a current acceleration value of the airplane; and
displaying at least one speed trend symbol symbolizing the current acceleration value and the speed of the airplane at the end of a predetermined duration on a speed scale represented on a viewing screen,
monitoring the measured air speed and the current acceleration value;
controlling the airplane to fly according to one of a constant speed and a constant Mach number;
calculating a corrected value of the current acceleration value, wherein the calculating includes:
determining a current vertical speed of the airplane and a coefficient value dependent on a current altitude and a current Mach number of the airplane;
calculating a corrective value based on a product of the current vertical speed and the coefficient value, and
adding the corrective value to the current acceleration value to obtain the corrected value, and
transmitting to the viewing screen for display:
the current acceleration value while the airplane is controlled to fly at a constant speed; and
the corrected value of the current acceleration value while the airplane is controlled to fly at a constant Mach number.

9. The method as in claim 8, wherein the monitoring includes a selection by a pilot interacting with a control panel for an automatic piloting system, wherein the selection is one of a control for a flight according to a constant speed and a control for a flight according to a constant Mach number.

10. The method as claimed in claim 8, wherein the monitoring includes transmission of information by a flight management system, wherein the transmitted information indicates whether the control of the airplane is according to the constant speed or according to the constant Mach number.

11. A primary flight display (PFD) device for displaying attitude information on an airplane, said device comprising:
a communication link providing current air speed data to the PFD device;
a calculation unit associated with the PFD, responsive to the current air speed data, and configured to calculate a current acceleration value based on the current air speed data;
a viewing screen associated with the PFD which displays, in real time, on a speed scale, at least one speed trend symbol representative of the current acceleration value;
a monitor responsive configured to identify whether the airplane is controlled to fly according to a constant speed and whether the airplane is controlled to fly according to a constant Mach number;
a calculator associated with the PFD and configured to calculate a corrected value of the current acceleration value, wherein the speed trend symbol is zero while the airplane flies at a constant March number and the air speed monitor identifies the airplane as being controlled according to the constant March number, wherein the calculation of the corrected value includes calculating a corrective value which is proportional to a current vertical speed of the airplane and a coefficient value determined using a current altitude and on current Mach number of the airplane; and adding the corrective value to the current acceleration value to obtain said corrected value; and a transmitter associated with the PFD configured to transmit to the viewing screen for display the speed trend symbol, the current acceleration value while the airplane is controlled to fly according to the constant speed; and the corrected value of the current acceleration value while the airplane is controlled to fly according to the constant Mach number.

12. The device in claim 11, wherein the monitor detects a selection by a pilot of the airplane interacting with a control panel relating to an automatic piloting system of the airplane, wherein the selection is one of to control the airplane to fly at the constant speed and to control the airplane to fly at the constant Mach number.

13. The device as claimed in claim 11, wherein the monitor transmits automatically information from a flight management system indicating whether the airplane is flying at the constant speed or at the constant Mach number.

14. A method to generate a speed trend symbol for a display in an aircraft comprising:
automatically receiving a current air speed of the airplane;
automatically calculating a current acceleration value of the aircraft;
calculating a corrected value of the current acceleration value, wherein the corrected value is calculated using the current acceleration value, a current Mach number of the airplane and a current altitude of the airplane, and wherein the corrected value is zero while the airplane is controlled to fly at a constant Mach number;
determining whether the aircraft is being controlled to fly at a constant air speed or at a constant Mach number;
generating a speed trend symbol which represents the current acceleration value if the determination is that the aircraft is being controlled to fly at the constant air speed and represents the corrected acceleration value if the determination is that the aircraft is being controlled to fly at a constant Mach number; and
displaying on a viewing screen in the airplane the generated speed trend symbol adjacent a speed scale indicating a current speed of the airplane.

15. The method of claim 14, wherein the calculation of the corrected value of the current acceleration value comprises:
determining a current vertical speed $dZp/dt$ of the airplane;
determining a coefficient $dCAS/dZp$ selected from a tabulation of coefficients $dCAS/dZp$, wherein the selection is based on the altitude and Mach number of the airplane;
calculating a coefficient value based on a product of the current vertical speed $dZp/dt$ and the coefficient $dCAS/dZp$; and
summing the corrective value and the current acceleration value to obtain the corrected value of the current acceleration value.

* * * * *